Feb. 13, 1945.  H. W. ABSHIRE  2,369,123
METHOD OF AND APPARATUS FOR TREATING SUBSTANCES
Filed Nov. 8, 1941  2 Sheets-Sheet 2
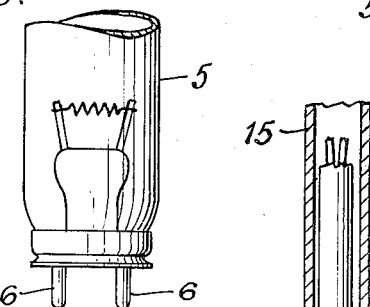
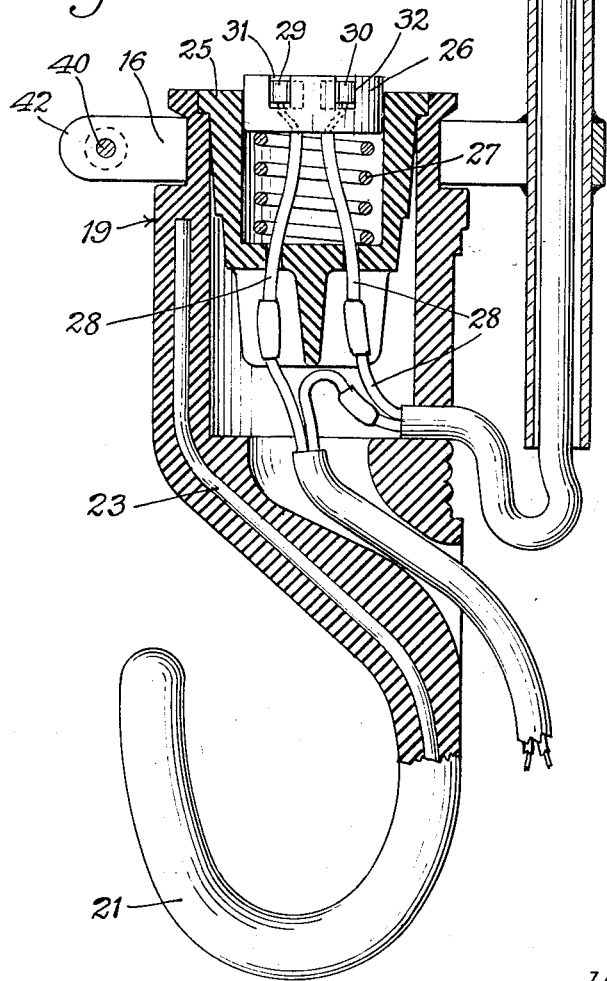
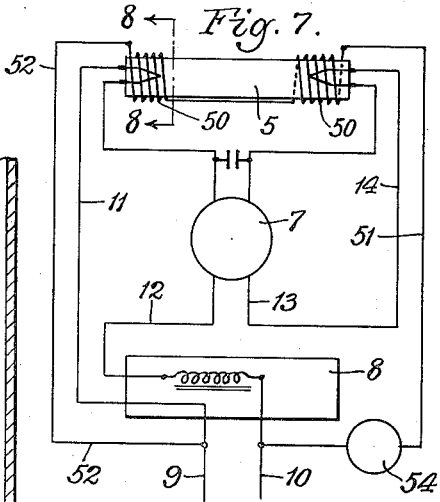
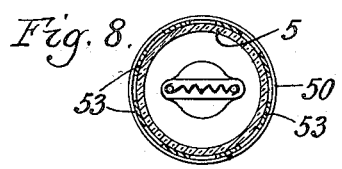
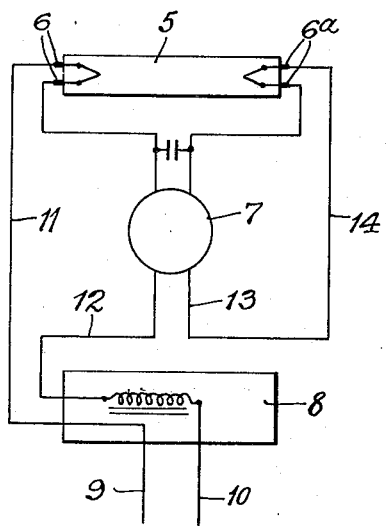
Inventor.
Harold W. Abshire.
by Parker Harter
Attorneys.

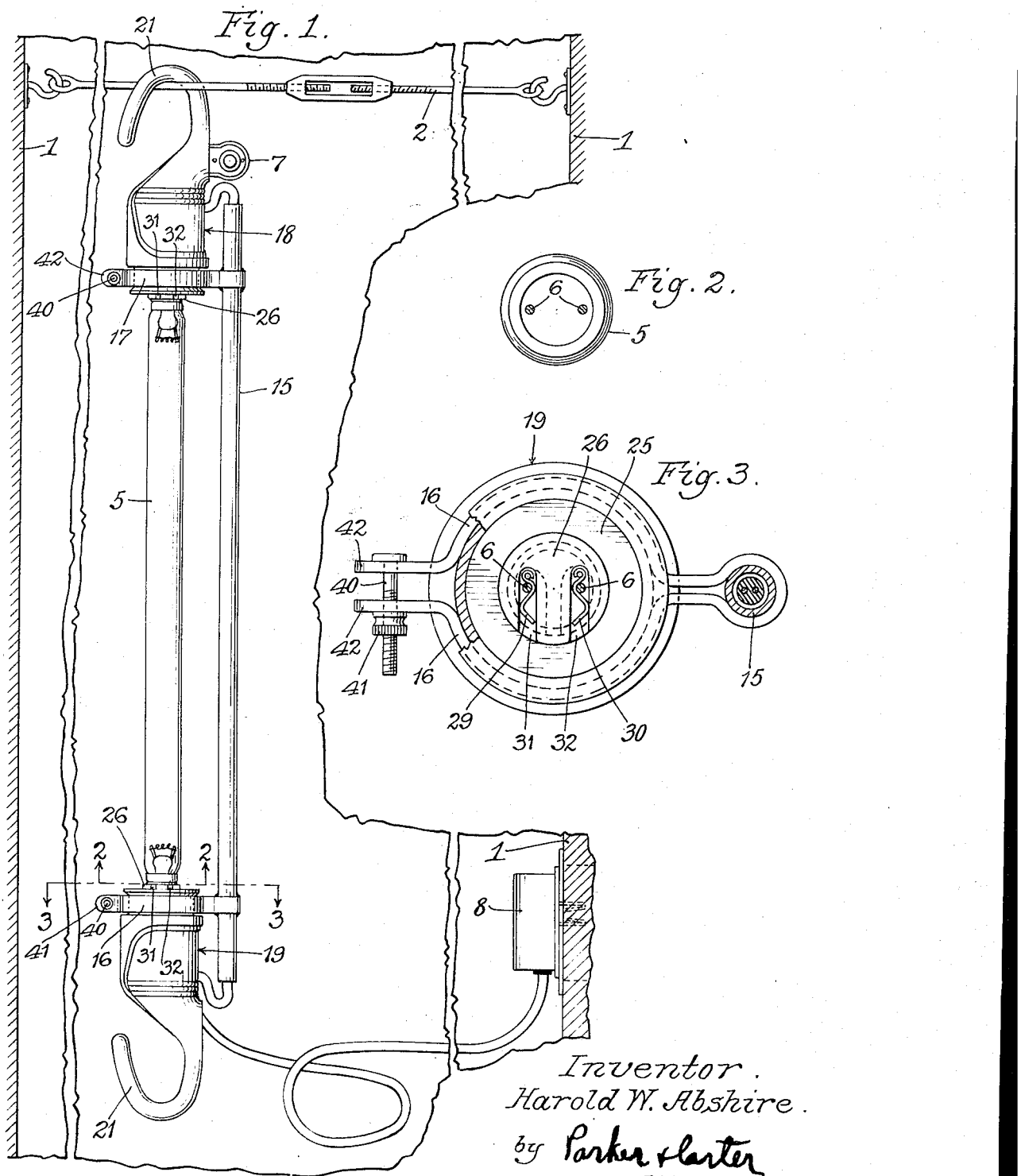

Patented Feb. 13, 1945

2,369,123

UNITED STATES PATENT OFFICE 2,369,123

METHOD OF AND APPARATUS FOR TREATING SUBSTANCES

Harold W. Abshire, Oak Park, Ill.

Application November 8, 1941, Serial No. 418,290

7 Claims. (Cl. 250—51)

My invention relates to an improvement in the apparatus for and method or process of treating materials, including meats, living organisms and perishable food products, in order to destroy bacterial life.

One application of my invention is to the treatment of meats or other foodstuffs in order to preserve the meat, prevent bacterial activity, and sliminess and surface and subsurface deterioration, or mold, which may result for example in meat storage areas from bacterial activity.

Another application of my invention is to the sealing or surface treatment of meats or other substances in order to prevent bacterial activity or in order to make the surface less vulnerable to bacterial activity, and the like, resulting therefrom, by thickening and sealing the cut surface, preventing bacterial activity and dehydration.

Another application of my invention is to the treatment of diseased surfaces such as surface infections in living organisms.

Another purpose is the provision of an efficient and preferably portable unit of flexible application, which may for example be suspended or otherwise supported in a butcher shop cooler, or other such storage zone, and which may be moved toward and away from the material to be treated, and which may for example be moved closely across the surface of meats and the like.

Another purpose is the provision of improved means for positioning the effective element of a unit.

I illustrate my invention as employing a mercury vapor lamp. It will be understood that I do not wish to be limited to this specific means.

Other purposes will appear from time to time in the course of the specification and claims.

I illustrate my invention more or less diagrammatically in the accompanying drawings wherein:

Fig. 1 is a vertical section with parts in side elevation illustrating the mechanism adapted for the carrying out of my invention;

Fig. 2 is a section on the line 2—2 of Fig. 1 on an enlarged scale;

Fig. 3 is a section on the line 3—3 of Fig. 1 on an enlarged scale;

Fig. 4 is a vertical section on an enlarged scale illustrating the lamp socket I may employ;

Fig. 5 is a view of the lower end of the lamp;

Fig. 6 is a wiring diagram;

Fig. 7 is another diagrammatic view illustrating a heater for the tube; and

Fig. 8 is a section illustrating a heater or heating coil applied to the tube.

Like parts are indicated by like symbols throughout the specification and drawings.

Referring to the drawings, 1, 1 generally indicate any suitable walls or enclosing members, which may enclose a room, a showcase, a refrigerator, or any other space in which my apparatus and method are to be employed. 2 is any suitable supporting means, herein indicated as having a turnbuckle for the adjustable or more or less flexible support of the treating member or means below described. It will be understood, of course, that any other suitable supporting means may be employed.

Referring to the treating member, it includes a lamp 5, herein shown as a quartz mercury vapor lamp. It will be understood, however, that any suitable lamp or member may be employed, and that a quartz mercury lamp is indicated merely as a practical and satisfactory lamp for treating materials in accordance with my method. The lamp 5, which I will hereafter call the tube, is provided with any suitable contacts, those at one end being illustrated as at 6.

The wiring diagram does not form part of the present invention, but, referring to Fig. 6, I illustrate a controlling switch 7, ballast means 8, outside power lines 9 and 10, and contacts 6, 6 for one end of the tube, and 6a, 6a for the other end, and intermediate wiring connections or lines 11, 12, 13 and 14, arranged as shown in Fig. 6.

Referring to the lamp unit, I provide a tube 15, which may have secured to each end thereof holding rings 16, 17, within which are flexible hook members generally indicated as 18, 19, with hooks 21, 21, which may be formed of rubber or any other suitable material, preferably slightly flexible or compressible and which, if desired, may be reinforced by metal or other internal reinforcements 23. Housed in each such hook is a socket including contacts for engaging the contact pins 6, 6 and 6a, 6a of the lamp tube 5.

I illustrate in Fig. 4 a socket member 25, which may be fixed in the lower hook structure 19, but which has therein a spring thrust plunger 26 normally urged toward outer position by the coiled spring 27 compressed between it and the bottom of the socket 25. The wiring may be enclosed in any suitable flexible insulating members or conduits 28, in such fashion that the movement of the plunger 26 does not affect the electric connection. However, the plunger is provided with conductive sockets 29 and 30 adapted to receive the pins 6, 6.

It will be understood that normally, in inserting the lamp tube 5, the lower pins 6 will be positioned in the contacts 29 and 30, and the user will then press down on the lamp 5, thus depressing the plunger 26. This permits the lamp tube to be aligned with both sockets, and when the operator releases the tube, the spring 27 maintains the upper pins 6a in contact with any suitable receiving socket contacts, which may be employed with the upper member 18 but are not herein shown in detail. In positioning the pins thus in the members 29, and 30, their insertion is made easier by channeling the plunger 26, as at 31, 32, the pins 6, 6 being actually gripped by the contacts 29 and 30. The operator first pushes in the pins 6, 6, depresses the plunger 26, and the light 5, aligns the upper pins 6a, 6a with any suitable receiving members on the hook 18; then the operator releases the tube, and the device is firmly held in place.

Preferably an identical plunger structure, such as is shown in Fig. 4, is provided also for the hook 18, and the spring 27 in the lower socket is balanced with a similar spring in the upper socket, so that the tube 5 will be held balanced between the two sockets, the two sockets being each independently spring thrust toward the other.

It will be also understood that, whereas the members 18 and 19 are normally locked by the rings 16, 17 against any movement in relation to the tube 15, the rings may be locked in position and also released by the employment of the headed screws 40, with locknuts 41, the screws passing through ears 42 formed in the rings 16, 17.

My method of employing this device may include suspending the tube or lamp in a space which also houses the material to be treated. Preferably, as shown in Fig. 1, supporting means are provided which permit ready movement of the lamp from place to place, for example toward and away from a given body of material or from juxtaposition with one body of material to juxtaposition with another when treatment of one body is concluded and treatment of another body begins. Or the lamp may simply be left in the place to affect generally all the material within the space. It is understood that the air about the substances treated is sterilized by the lamp.

As specific applications I may mention the sterilization of meat or foodstuffs in showcases, refrigerators, and the like, and the prevention of formation of slime or mold on the surface of meats and foodstuffs. In such treatment it may be desirable initially practically to sear the meat by placing the lamp close to its surface for a predetermined or controlled period and then withdrawing the lamp to a greater distance, which, however, is not great enough to place the meat outside of the radius of action of the lamp. In this connection it is advantageous that the unit employed be made light enough for manual manipulation and also that it be supported in such fashion as to be moved freely toward and away from the material to be treated, so that it may be positioned close enough for a lethal, and not a stimulating, application.

Note that the color of meat may to some extent be controlled by varying the degree of approach or nearness of approach of the unit. I, therefore, find it practical to employ a unit of such size and so supported that it can readily be manipulated and moved about, but it is also advantageous that adequate supporting means be provided so that, when desired, the unit can be adjustably fixed in relation to the material to be treated.

I find it advantageous to control the tube pressure, and thus the band of light it transmits. I find it advantageous, for example, to employ a tube which has its maximum output at in the neighborhood of 38 degrees Fahrenheit, or in a broad sense at the temperature of the material being treated or stored in refrigerators and the like. This result can be obtained by controlling the pressure within the tube.

As a means for controlling tube pressures, I may control the temperature of the tube. I illustrate for example, as in Figs. 7 and 8, a heating coil 50, which may be in circuit with the lines 9 and 10 through any suitable conductive lines 51 and 52. The coil 50 may be spaced from or supported on the tube, for example, by mica strips or elements 53. 54 indicates any suitable switch, which may include a rheostat or other means for breaking the circuit through the coil 50 or for varying the current to which it is subjected.

I find that when meat or other food products are subjected to the light of the normal quartz mercury vapor tube, they tend to take on an unsightly or rather unpleasant greenish-blue and unnatural color. I may filter out the blue, where advisable, by employing any suitable blue-absorbing substances or pigments or materials, which may be applied to or surround the tube in such fashion that, without interfering substantially with the passage of the ultraviolet light, the color of the meat is changed and the meat subjected to the ultraviolet radiation does not have the unsightly tinge which it takes under the normal radiation of a quartz lamp. I may for example use a suitable, thin Cellophane or film.

It will be understood that the lamp tube 5 may itself be made of or covered with or surrounded by any suitable pigment or material which will absorb the blue light.

Another application of my lamp and method consists in not merely sterilizing meat in a showcase, refrigerator, or the like, but in consequence or at the same time bringing out a name or brand on the meat. For example, fluorescent powder may be placed on the meat, or substances being treated, to show a pattern, brand or advertising material, which fluorescent powder will respond by a change in appearance when subjected to the ultraviolet radiation of the tube 5.

It will also be understood that any suitable circuit breaker not herein shown in detail may be employed so that the source of radiation may operate intermittently. This will provide adequate treatment of the material, but the intermittent operation of the source of radiation causes the pattern, brand or advertising material also to appear intermittently, or in flashes, which renders it more obvious and evident to the eye of the observer.

A further application or use of my invention is in employing the radiation for stimulating rather than for lethal purposes, as for example in the growth of yeast spores. It will be understood that, when the lamp or light source closely approaches a given object to be treated, its effect is lethal, whereas when it is sufficiently remote from some substances, the result is a stimulation. This is a further factor which renders the employment of a relatively light, portable and easily moved unit important.

It will be realized that, whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing. The use and operation of my invention are as follows:

In applying the lamp, the lower end of the lamp 5 is inserted in contacts in the member 26 and pushed down against the spring 27 until the upper prongs of the lamp will move sideways into the slots 31 and 32 of the upper member 26. When the lamp is fully in, the members 26, 26 project slightly out of the members 18 and 19 an equal distance, the prongs 6, 6 and 6a, 6a projecting downwardly and upwardly beyond the faces of the socket 25 thus being held securely. If the upper prongs 6a, 6a of the lamp were entered endwise, it would be necessary unduly to compress the lower spring 27.

Then the unit is ready for use and may be manually manipulated and moved adjacent the material to be treated and moved across the surface, or it can be hung on any suitable support, such as the member 2, upon which it may be moved to vary its position in relation to the substance to be treated, which may be suspended or otherwise mounted within the space defined by the walls 1. Since I have an identical hook at each end of the lamp unit, it may be hung either way, depending upon the relative location of the lamp unit and the member 8.

Since in practice the mercury vapor may tend to settle at one end of the tube, I find it highly advantageous to have a hook at each end so that the tube can readily be reversed.

I claim:

1. In a device for treating materials by ultraviolet radiation, a container for the materials to be treated, a source of ultraviolet radiation, means for supporting said source of ultraviolet radiation within said container, and selectively at a plurality of points within said container, whereby the location of said source in relation to the materials being treated may readily be varied, said source of ultraviolet radiation including a body, an ultraviolet tube mounted on said body and an element associated with said body for engaging the support means at a selected point.

2. In a readily manually movable device for treating material by ultraviolet radiation, an ultraviolet ray lamp including an elongated tube, a socket element located at each end of the tube, a supporting connection joining said socket elements and unitary hook means for said device for mounting the lamp in different positions on a suitable support means.

3. In a readily manually movable device for treating material by ultraviolet radiation, an ultraviolet ray lamp including an elongated tube, a socket element located at each end of the tube, a supporting connection joining said socket elements and unitary hook means for said device including a separate hook mounted at each end of the device and arranged for application separately or jointly to suitable support means.

4. In a readily manually movable device for treating materials by ultraviolet radiation, a pair of widely spaced socket elements, an elongated substantially rigid rod-like member for connecting said socket elements together and for preventing their relative movement, a hook associated with each said socket element, and ultraviolet tube mounted at each end in one of said socket elements, and yielding means for holding said tube removably mounted between said socket elements.

5. In a readily manually movable unit for treating food, an elongated tube having material therein adapted when energized to radiate ultraviolet rays from the tube, a device for mounting said tube and electrically connecting it to a current supply, and means on the device for readily supporting the unit at a selected point and providing for the substantially unobstructed radiation of ultraviolet rays from the tube in all directions radially and diagonally of the tube axis.

6. In a device for treating materials by ultraviolet radiation, a narrow elongated member, sockets mounted on said member and spaced apart and opposing each other, an elongated tube having its ends received in said sockets, and material therein adapted when energized to radiate ultraviolet rays from the tube, said member, sockets and tube comprising a readily movable portable unit providing for substantially unobstructed radiation of ultraviolet rays from the tube in all directions transversely and diagonally of the tube axis, there being a support-engaging element on said member providing for the ready shifting of the device manually from one point of support to another.

7. A device for treating meats or the like comprising a container of substantially large area, support means extending from one side of the container to another, and an elongated lamp for radiating ultraviolet rays and having elements adjacent both ends for ready application to said support means at any desired point along said means so that the lamp may be positioned with its axis disposed vertically or horizontally and rays from the lamp may be radiated in all directions transversely of the lamp axis and toward the sides of the container to treat material in the container.

HAROLD W. ABSHIRE.